United States Patent [19]

Balling et al.

[11] Patent Number: 5,452,033
[45] Date of Patent: Sep. 19, 1995

[54] SINGLE USE PHOTOGRAPHIC FILM PACKAGE AND CAMERA

[75] Inventors: Edward N. Balling, Rochester; David A. Hodder, Spencerport, both of N.Y.

[73] Assignee: Eastman Kodak Company, Rochester, N.Y.

[21] Appl. No.: 254,337

[22] Filed: Jun. 6, 1994

[51] Int. Cl.⁶ .......................... G03B 1/00; G03B 17/02
[52] U.S. Cl. ........................... 354/212; 354/288
[58] Field of Search .................. 354/288, 212

[56] References Cited

U.S. PATENT DOCUMENTS

| | | | |
|---|---|---|---|
| 4,831,398 | 5/1989 | Nakayama et al. | 354/212 |
| 5,054,710 | 10/1991 | Ikariya et al. | 242/74 |
| 5,235,366 | 8/1993 | Kucmerowski | 354/212 |

FOREIGN PATENT DOCUMENTS

| | | | |
|---|---|---|---|
| 0465897 | 1/1992 | European Pat. Off. | G03B 19/04 |
| 44-8856 | 10/1969 | Japan . | |
| 2234082 | 1/1991 | United Kingdom | G03B 17/02 |

*Primary Examiner*—Monroe H. Hayes
*Attorney, Agent, or Firm*—J. F. Breimayer; Roger A. Fields

[57] ABSTRACT

A recyclable, single use photographic film package and camera comprising a light-tight camera mechanism having a frame forming exposure gate, a roll of unexposed film withdrawn from its cartridge and pre-wound on a film takeup spool disposed on one side of the exposure gate, the cartridge disposed on the other side of the exposure gate, and an externally operable film winding thumbwheel for winding the filmstrip through the exposure gate and back into its cartridge as the film is exposed frame by frame. When all frames are exposed, the exposed film is removed and processed, and the package is recycled by substituting a fresh film cartridge and new packaging for resale. To prevent unauthorized reuse of the camera mechanism by refilling it with other than genuine film, a component of the takeup spool is intentionally damaged upon winding the last image frame into the film cartridge. The damaged takeup spool is not usable to pre-wind the substitute filmstrip onto it and must be replaced by an authorized recycler of the film package.

22 Claims, 7 Drawing Sheets

SINGLE USE PHOTOGRAPHIC FILM PACKAGE AND CAMERA

FIELD OF THE INVENTION

The present invention relates to a recyclable, single use, lens-fitted photographic film package and more particularly to a method and apparatus for rendering the camera mechanism non-reusable upon exposure of the film contained therein while allowing reuse by an authorized party by replacement of damaged components thereof.

BACKGROUND OF THE INVENTION

Photographic film packages containing a single roll of film installed in a recyclable, lens-fitted camera intended for single use, as typified by the Kodak° "Fun Saver 35°", have gained popularity in recent years for use by photographic enthusiasts on the spur of the moment. Such lens-fitted photographic film packages comprise the elements of a camera fitted with an exposure lens, a simple exposure mechanism which includes a film winding mechanism, a shutter mechanism and a film cartridge or canister, e.g. a standard or special form 35 millimeter cartridge, packaged within the camera which can be sold wherever photographic film is sold for such spontaneous use. Alter the exposure of all frames of the film in the package, it is returned to a photo shop or photo laboratory without removing the film. There, the film package is opened, and the exposed film is developed to make prints therefrom while the paper packaging and mechanism without the film is either scrapped or returned to the manufacturer for recycling. The prints, together with the developed film, are returned to the customer. Such a lens-fitted single use film package makes it easy to take pictures because there is no need for film loading and unloading, and the cost is relatively low. Such single use camera and photographic film packages are disclosed in several forms in U.S. Pat. Nos. 4,831,398, 5054,710 and in Japanese Patent Specification 44-8856.

In those film packages which employ 35 mm film, the filmstrip is withdrawn from the canister or cartridge and pre-wound into a space or film container around a film winding reel during manufacture so that, in use, the filmstrip is advanced back into the canister as each image frame is exposed. It is therefore unnecessary to provide the camera mechanism with a rewind capability which would otherwise increase its cost and complexity.

In the above-cited patents and Japanese specification, the filmstrip leading end or leader is configured to slip into a slit in the shaft of a film spool having a catch or catches formed therein. On insertion during loading of the filmstrip, the filmstrip sprocket hole perforations or other holes in an especially configured leader slip onto the catch or catches. After the camera is closed, the catch or catches engage the filmstrip holes during the pre-wind operation. Typically, the filmstrip is drawn out of its cartridge by a mechanical driver engaging and rotating the end of the shaft exposed through the camera body until the entire filmstrip is wound around the shaft. In certain cases, the end of the shaft is then deformed to prevent it from being driven again. Since in such a case there is no mechanism left to withdraw the filmstrip from the canister and pre-wind it, the camera body cannot be re-filled after use by the average amateur photographer.

The camera mechanisms employed in film packages of this type are typically provided with a thumb actuated film advance wheel or thumbwheel which moves the filmstrip into the film canister one frame at a time, which in turn moves a cam causing a picker to decrement the counter wheel by one count (exposure). The remaining unexposed frames are indicated to the user by the number on the counter wheel appearing in an aperture in the paper packaging overlying the camera mechanism. When the user is ready to take a picture, the film advance thumbwheel is wound in the direction indicated on the package until it stops. In that process, the moving film advances a sprocket which in turn moves a cam causing a picker to decrement the counter wheel by one count. When the last image frame is exposed, the user is instructed to continue to wind the thumbwheel until the counter reads "zero" which ensures that the exposed frames are wound completely into the film canister. In this process, the filmstrip perforations slip off the catch or catches, and the leading end is wound into the light-tight cartridge. Thereafter, the entire film package is submitted to a photo finisher for developing the filmstrip and making prints as indicated above.

As described in commonly assigned U.S. Pat. No. 5,235,366, the photographic film industry is highly competitive, and over the years instances of passing off of counterfeit film canisters have been uncovered. In single use cameras of the type described, it is not possible for a consumer to view the film canister actually installed within the camera mechanism. Consequently, the camera mechanisms and external packaging identifying the genuine manufacturer are all that the consumer has to rely on that the film within the package is genuine. While the manufacturer makes an effort to have photo finishers return the film packages for recycling, the packages may become diverted to others who refill, repackage and resell the film package with counterfeit film at a considerable profit.

The '366 patent discloses one form of a simple mechanism to discourage such unfair competitive acts, and ensure consumers of the quality and reliability they expect to receive when purchasing the branded film package. The circumference of the counter wheel is provided with teeth that engage with the picker rotated by cam the and sprocket except at one location where the tooth is replaced by a solid tab which interferes with the picker such as to shear it off from the cam as the "zero" count is reached. The camera is thus rendered unusable until the cam with an intact picker is replaced in the recycling of the camera after being returned to the manufacturer by the film processor.

DISADVANTAGES OF THE PRIOR ART

The damage to the picker disables the image frame counter and inhibits unauthorized reuse of the camera mechanism. However, it does not prevent reuse if one were willing to forgo the image frame exposure count. Moreover, it adds a component to the parts to be replaced on recycling the camera mechanism, and the replacement involves the inconvenient removal of the top of the camera to obtain access to the damaged cam.

SUMMARY OF THE INVENTION

It is therefore an object of the present invention to provide a recyclable, single use film package and camera mechanism which cannot be re-filled with a film cartridge and reused without the replacement of a certain key component allowing the filmstrip to be withdrawn and pre-wound.

The present invention is realized in a method and apparatus for damaging the camera mechanism of a recyclable, single use, photographic film package of the type fitted with a roll of unexposed film pre-wound onto a takeup spool and provided with a film advance mechanism to advance the film past an exposure gate so that the film may be exposed by the operation of a shutter release successively until all frames are exposed, wherein the damage susceptible camera mechanism inhibits reloading the camera mechanism with an unexposed filmstrip for unauthorized re-use.

In a preferred embodiment of the present invention, the camera mechanism is provided with a film takeup spool having a shaft around which the filmstrip is pre-wound and from which the filmstrip is unwound by operation of the film advance mechanism, the shaft having a slit for into which the filmstrip leader is inserted during loading of the filmstrip and a breakaway tooth is provided for attachment to the filmstrip leader in the pre-wind operation and breaks away during advancement of the filmstrip into the film cartridge when all exposures are completed.

A further edge tooth that engages a further leader perforation when the takeup spool is rotated in the pre-wind operation is formed in the side of the slit. The breakaway tooth is weakened so as to deform and release the leader under the force applied in advancing the filmstrip into the cartridge after all image frames are exposed.

In a further aspect of the invention, the slit is also configured to impress deformations into the leader to separate and space the leader from the underlying convolutions of the filmstrip in the film cartridge.

ADVANTAGEOUS EFFECTS OF THE INVENTION

The slit is preferably configured to provide secure and positive guidance of the leader into attachment onto the breakaway tooth to prevent the leader from being released inadvertently during pre-wind operations. The force applied during the pre-wind operation is distributed to the edge tooth to enhance the attachment and distribute applied forces.

The separation and spacing effected by the deformations impressed in the leader aids in grasping and retracting the leader in order to pull the filmstrip out during photo finishing operations.

The incorporation of the invention into the takeup spool provides a single replacement part that is easily replaced in the operation of removing the exposed film and replacing it with a fresh roll of film.

BRIEF DESCRIPTION OF THE DRAWINGS

The above and other objects and features of the invention will become apparent from the following detailed description taken in conjunction with the preferred embodiments thereof with reference to the accompanying drawings in which like parts are designated by like numerals throughout the views of the drawings and wherein.

DETAILED DESCRIPTION OF THE PREFERRED EMBODIMENTS

Figure 1:
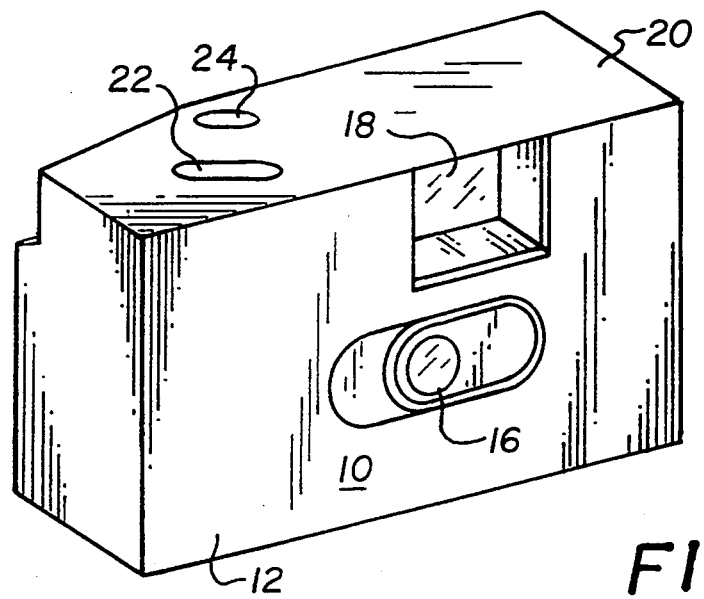
FIG. 1 is a front perspective view of the recyclable single use photographic film package of one embodiment of the present invention.
Figure 2:
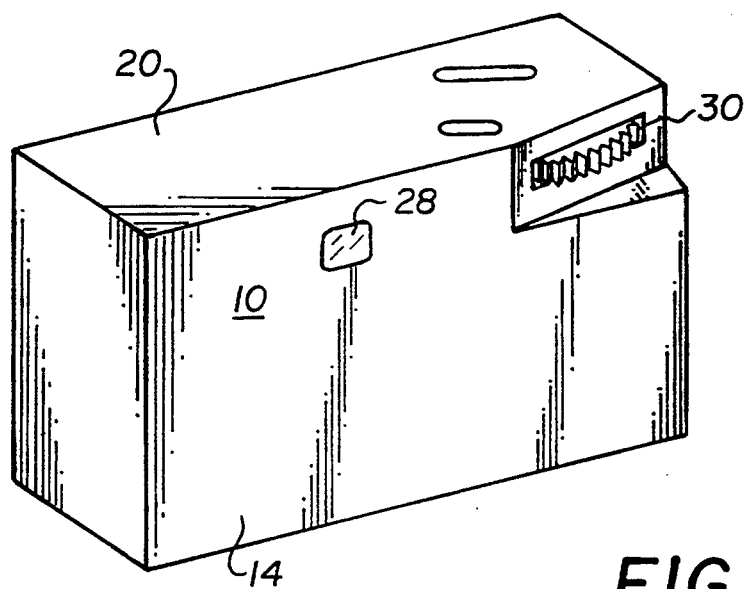
FIG. 2 is a rear perspective view of the photographic film package of FIG. 1.

Referring now to the drawings, FIGS. 1 and 2 show schematically a lens-fitted, recyclable film package and camera mechanism of a type known in the prior an (and depicted in the above-referenced '366 patent) in which the improvements of the present invention depicted in the remaining Figures may be implemented. The camera mechanism is largely formed of plastic and enclosed in a camera housing to be described in reference to FIG. 3. The housing is typically, but not necessarily, encased in an exterior camera package 10 preferably made of cardboard and illustrated with trademarks and graphics of the manufacturer. The camera package 10 comprises a main front cover section 12, a back cover section 14, a top section 20 and side and bottom sections. The main front cover section 12 is provided with apertures for exposing the taking lens 16 and the viewfinder window 18 of the enclosed camera mechanism. The top wall 20 has a pair of apertures 22 and 24 therein for providing access to the shutter release button and for viewing the underlying exposure counter wheel number, respectively, of the enclosed camera mechanism. A viewfinder eyepiece aperture is provided in the back cover section 14 for the camera viewfinder 28. A thumbwheel opening 30 allows a thumbwheel 32 to be exposed to be rotated by the user to advance the filmstrip to the next image frame to be exposed. A film package of this type presently available from Eastman Kodak Company as the Fun Saver 35 and in other similar configurations, including single use camera packages having a battery operated flash unit as described below with reference to FIG. 3.

When the user is ready to take a picture, the film advance thumbwheel 32 is wound in the direction indicated on the package until it stops. When the last exposure image frame is exposed, the user is instructed to continue to wind the thumbwheel 32 until the exposure counter 34 reads "zero" which ensures that the exposed image frames are wound completely into the film cartridge within the camera mechanism. Since there is no mechanism provided to withdraw the filmstrip from the cartridge, the camera mechanism is not re-usable by the average amateur photographer. Thereafter, the entire package 10 is submitted to the photo finisher for developing the filmstrip and making prints as indicated above. In accordance with the present invention, the rewinding of the filmstrip into the cartridge damages the takeup spool 80.

Figure 3:
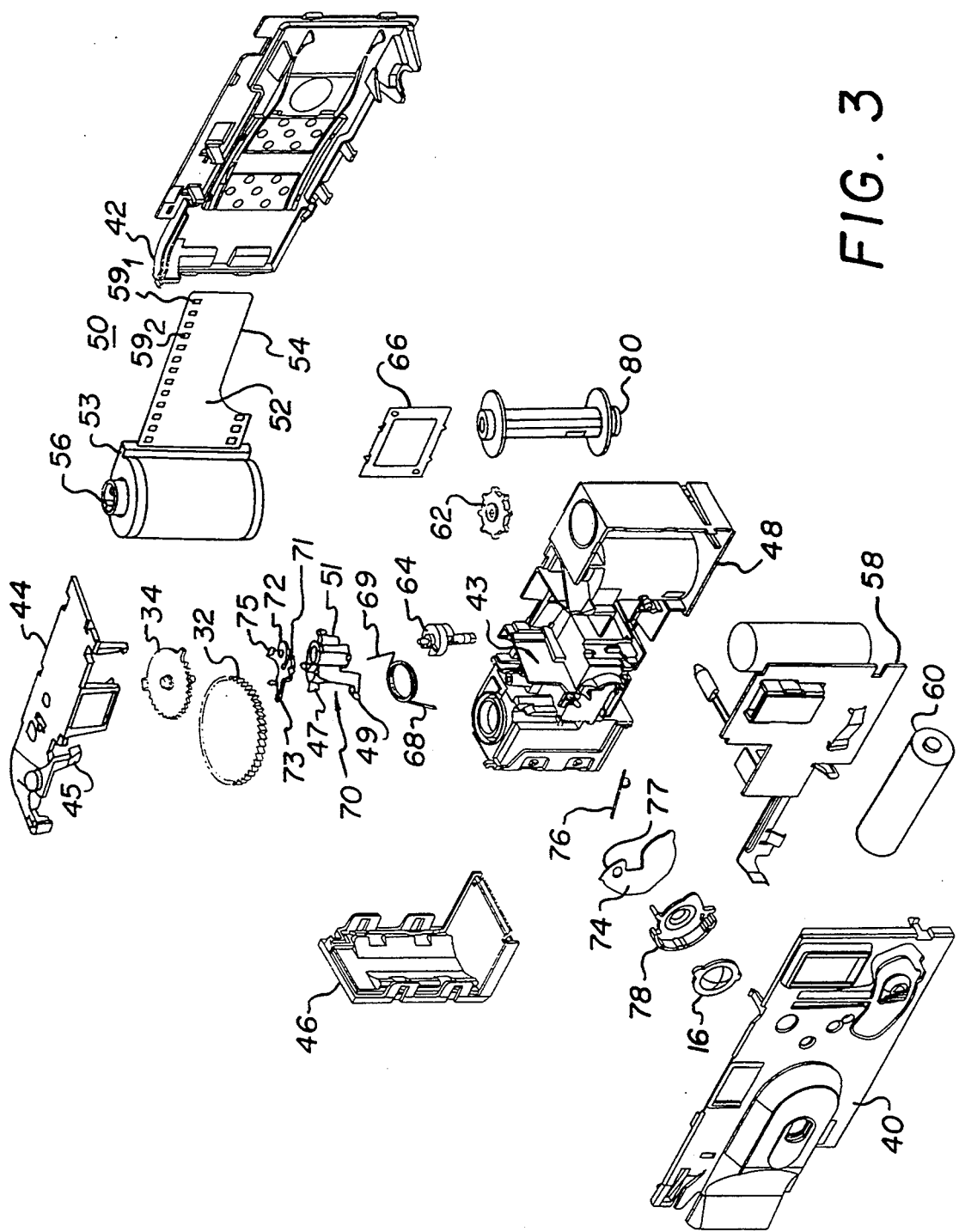
FIG. 3 is an exploded perspective view of a recyclable camera mechanism and film cartridge contained within the photographic film package of the type depicted in FIGS. 1 and 2 illustrating the construction of a film and camera package in which the present invention may be practiced.

Turning now to FIG. 3, it depicts in an exploded perspective view the major components of a single use camera mechanism 36 within a light-tight, plastic camera body which is formed of a front cover 40, back cover 42, top 44, film door 46 and camera frame 48. The film cartridge 50 is enclosed within the camera body, specifically supported within the camera frame 48, so that the filmstrip 52 extends across an exposure gate rear baffle 66 and is attached at its leader 54 in a slit in takeup spool 80 in a manner to be described.

As described below, the filmstrip is pre-wound out of the cartridge housing 53 and wound around the takeup spool 80. The thumbwheel 32 fits into the cartridge spool 56 when the components are assembled, so that the user may wind the thumbwheel 32 to advance the filmstrip an image frame at a time back into the cartridge housing 53. In that process, the filmstrip 52 rotates a film driving sprocket 62 which in turn rotates a metering cam 64 causing a picker on the cam 64 to rotate the counter wheel 34 which decrements the count visible through the frame counter aperture 24 by one count.

FIG. 3 also shows the interrelationship of the electronic flash, shutter release and exposure control components of the camera mechanism 36. In this particular camera mechanism 36, an electronic flash system 58 (not shown in FIGS. 1 and 2) is included, although it is not related operationally to the present invention. A battery 60 powers the electronic flash system 58. The electronic flash is triggered by operation of the shutter release.

Exposure of the filmstrip image frame defined by the rear baffle 66 is effected through the camera taking lens 16 mounted in the front cover 40 when the shutter blade 74 is opened for a pre-set exposure time. The shutter blade 74 pivots on a projection of the camera frame 48 when opening and closing. The high energy lever 70 and high energy spring 68 provide shutter opening force that is released on depression of the shutter release button formed in the top 44. The shutter blade 74 is restored to its normally closed position by the shutter spring 76. The exposure is made through a lens baffle 78 that defines the aperture setting.

The components of the shutter release assembly differ somewhat from those disclosed in the above-referenced '366 patent. Principally, the trigger latch disclosed and identified as "47" therein is replaced and its function simplified by the molded feature leg 45 of the top cover 44 cooperating with the leg 47 of the high energy lever 70. The shutter release assembly operates in generally the same fashion when the film advance mechanism cocks the high energy lever 70 as described therein.

Turning to film metering and cocking of the shutter release assembly, the exploded components of FIG. 3 are assembled and related as follows in that operation. Metering cam 64 is dropped through a hole in the frame 48 and pushed into the central opening of sprocket 62 to rotate with it as the filmstrip is advanced. The high energy assembly comprises high energy lever 70, metering lever 72 and high energy spring 68. High energy spring 68 is assembled to high energy lever 70 and then metering lever 72 is assembled to the top surface of high energy lever 70 and retained there by the upright leg 69 of high energy spring 68. The high energy assembly is positioned over a post of camera frame 48 with the other end of high energy spring 68 is fixed to the camera frame 48. An anti-backup leg of the metering lever 72 engages with the teeth of the thumbwheel 32 after the metering cam is rotated through 360° to halt the filmstrip advance and lock the thumbwheel. At the same time the shutter blade 74 is cocked to be released on depression of the shutter release button. These operations are described in detail in the above-incorporated '366 patent.

Frames on filmstrip 52 are exposed by depression of the shutter button (FIGS. 1 and 2) of camera top cover 44 which pushes leg 45 projecting from the top cover 44 down until leg 47 of high energy lever 70 is released. High energy spring 68 rotates the high energy lever 70 such that leg 49 of lever 70 hits tip point 77 on shutter blade 74 causing blade 74 to rotate upward. Rotating shutter blade 74 hits the shutter stop feature of camera frame 48 and rebounds back to its initial, closed position. High energy lever 70 continues to rotate until leg 49 hits rigid frame wall 43.

Meanwhile, leg 69 of high energy spring 68, which is hooked near metering lever leg 71, pulls metering lever leg 73 out of engagement with the teeth of thumbwheel 32. This allows the user to advance the filmstrip 52 to the next frame by rotating thumbwheel 32. The operator winds thumbwheel 32 until a recess of cam 64 has again aligned itself with high energy lever leg 51. At this point the force from high energy spring 68 causes high energy lever 70 to snap backwards, allowing high energy lever leg 47 to deflect top cover leg 45. Deflected top cover leg 45 rides up a ramp in frame 48 and locks with leg 47 of high energy lever 70.

A fraction of a revolution after the foregoing, metering lever leg 75 encounters a recess in cam 64. The force from leg 69 of the high energy spring 68 causes metering lever 72 to snap backwards, driving metering lever leg 73 sharply into engagement with the teeth on rotating thumbwheel 32. The above actions lock thumbwheel 32, preventing the operator from advancing more of filmstrip 52.

The initial pre-winding or withdrawal of filmstrip 52 out of cartridge 50 and onto takeup spool 80 is accomplished during initial assembly or recycling of the package by the use of a tapered defeat pin inserted through an opening in top cover 44 that pushes high energy lever leg 49 to the left so that high energy leg 51 is not touching cam 64 by rotating high energy lever 70 clockwise. Metering lever 72 is rotated counter-clockwise to release the thumbwheel 32. At this point, filmstrip 52 may be drawn from cartridge housing 53 and into a roll on takeup spool 80. An automatic pre-wind device like a powered screwdriver (not shown) meshes with an end slot of takeup spool 80 to rotate it clockwise (as viewed from above). As the filmstrip 52 is pulled from canister housing 53 thumbwheel 32, sprocket 62 and cam 64 spin freely. The pre-wind process continues until most of the filmstrip 52 has been wound on takeup spool 80, and the tape which attaches the end of filmstrip 52 to cartridge spool 56 is pulled partially through the cartridge slot. The prewind drive is disengaged from the takeup spool 80. High energy lever 70 and metering lever 72 are then released and rotate back so that the first exposure may be made. This operation is also the same as that disclosed in regard to FIG. 3 of the above-incorporated '366 patent.

After each exposure is made, advance of filmstrip 52 is accomplished by rotating thumbwheel 32 counterclockwise. The thumbwheel 32 rotates cartridge spool 56, thereby pulling filmstrip 52 into cartridge housing 53 and causing takeup spool 80, sprocket 62 and cam 64 to rotate. Metering of filmstrip 11 is accomplished during the continued rotation of sprocket 62 and attached cam 64. The total length of filmstrip 52 advanced is equivalent to the distance between eight perforations since there are eight teeth on sprocket 62.

Turning now to the remaining FIGS. 4–8, they depict the attachment of the leader 54 to the takeup spool 80 during loading of the film cartridge 50 and the manner in which the takeup spool is damaged when the filmstrip 52 is advanced into the film cartridge housing 53 after all image frames are exposed, so that the camera mechanism 36 may not be reloaded with a new film cartridge 50, in accordance with the present invention. The takeup spool 80 is replaced along with the film cartridge 50 when the camera is refilled and repackaged by an authorized party.

Figure 4:
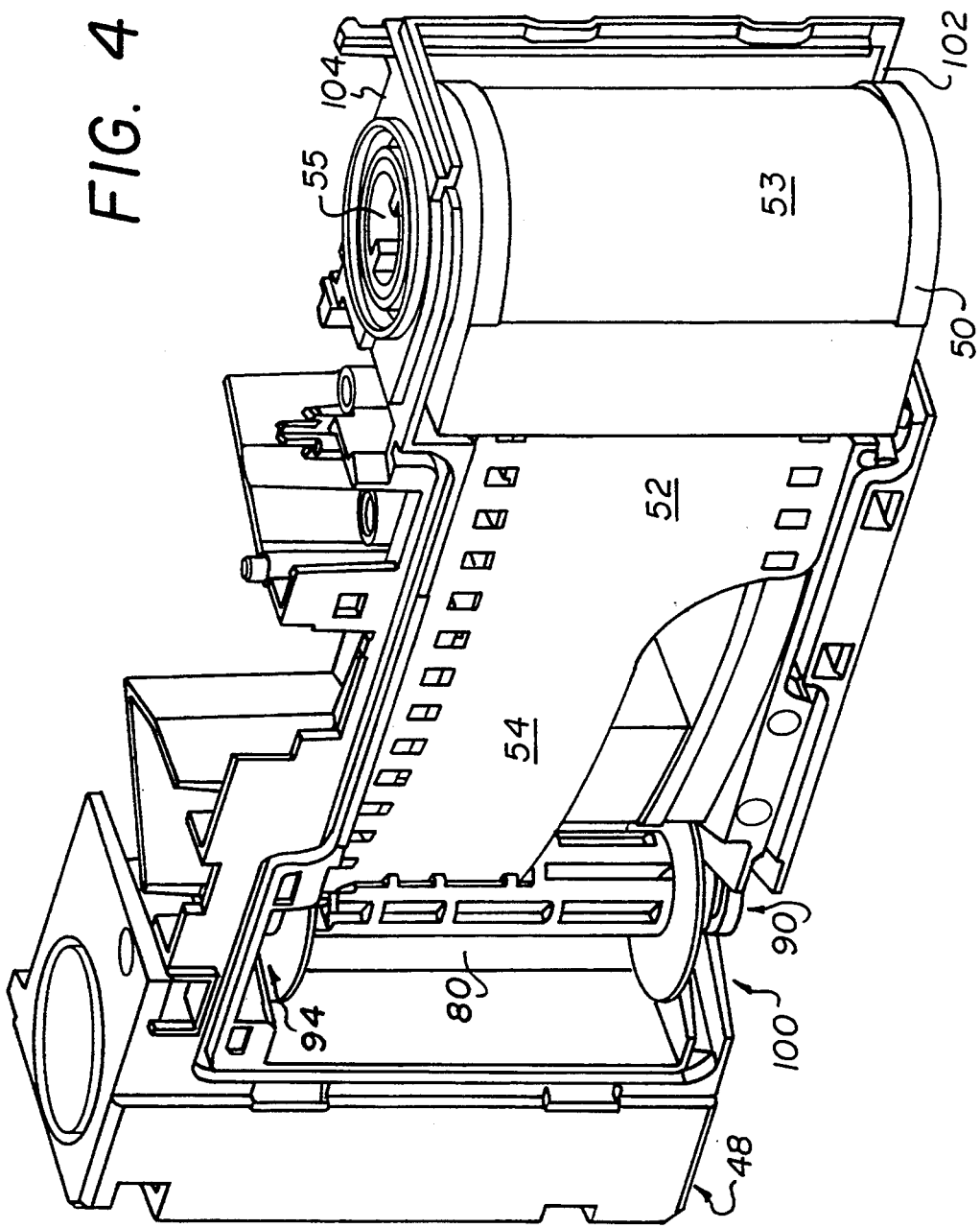
FIG. 4 is a perspective view of the camera frame shown in FIG. 3 with a film cartridge and takeup spool inserted in position and with the filmstrip leader engaged in the slit of the takeup spool strip.

FIG. 4 is a perspective rear view of the camera frame 48 shown in FIG. 3 with a film cartridge 50 inserted in position and with the filmstrip leader 54 engaged in the slit 82 of the takeup spool 80. FIG. 4 does not depict the other components of FIG. 3 to expose these pans for viewing. It will be understood that the other components of FIG. 3, except for the rear cover 42 and film door 46, will be assembled together in practice before the film cartridge 50 and the takeup spool 80 is inserted into the camera frame 48 as shown.

Figure 5:
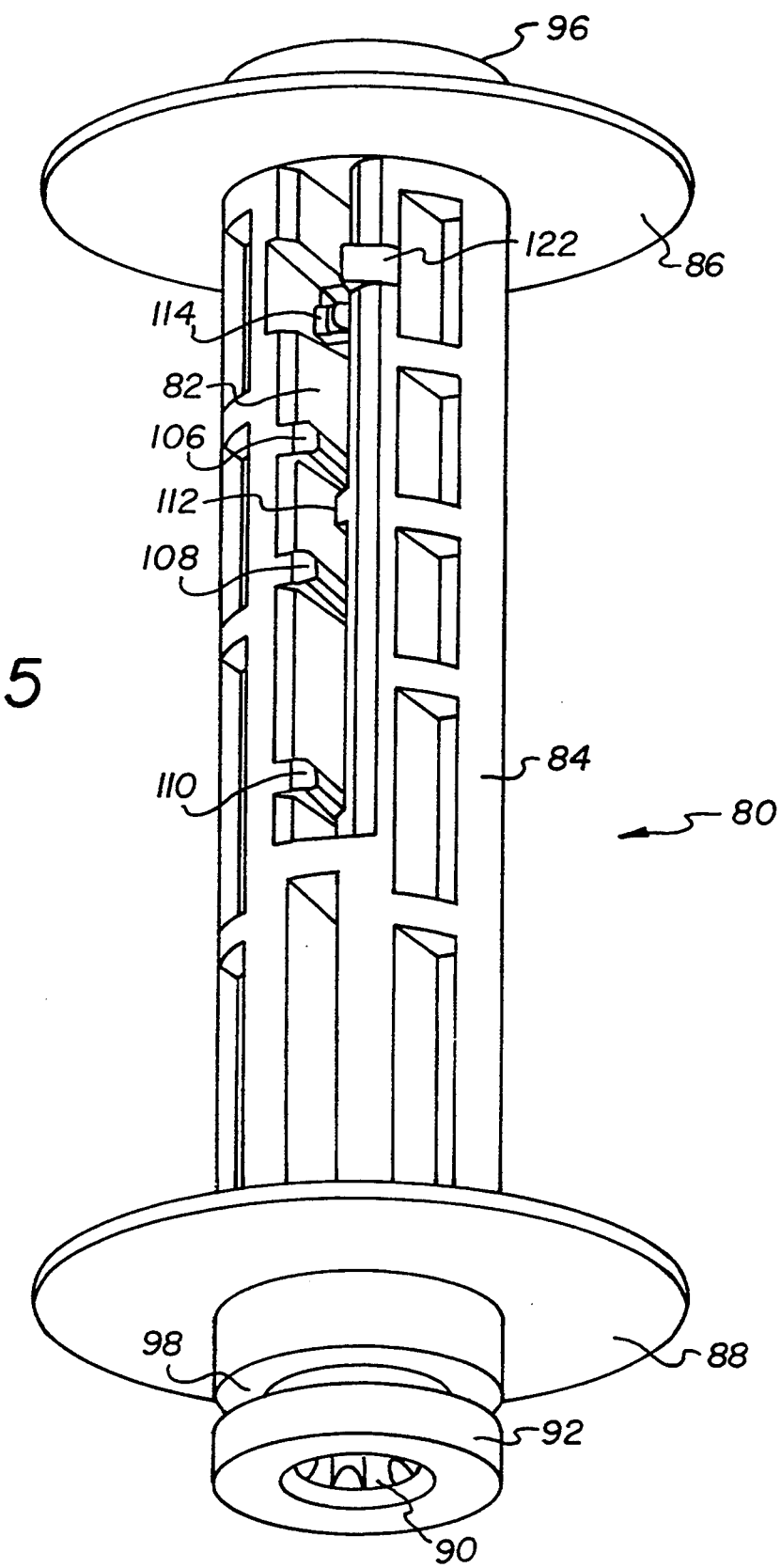
FIG. 5 is a side elevation view in perspective of the takeup spool showing features of the filmstrip leader receiving slit.
Figure 6:
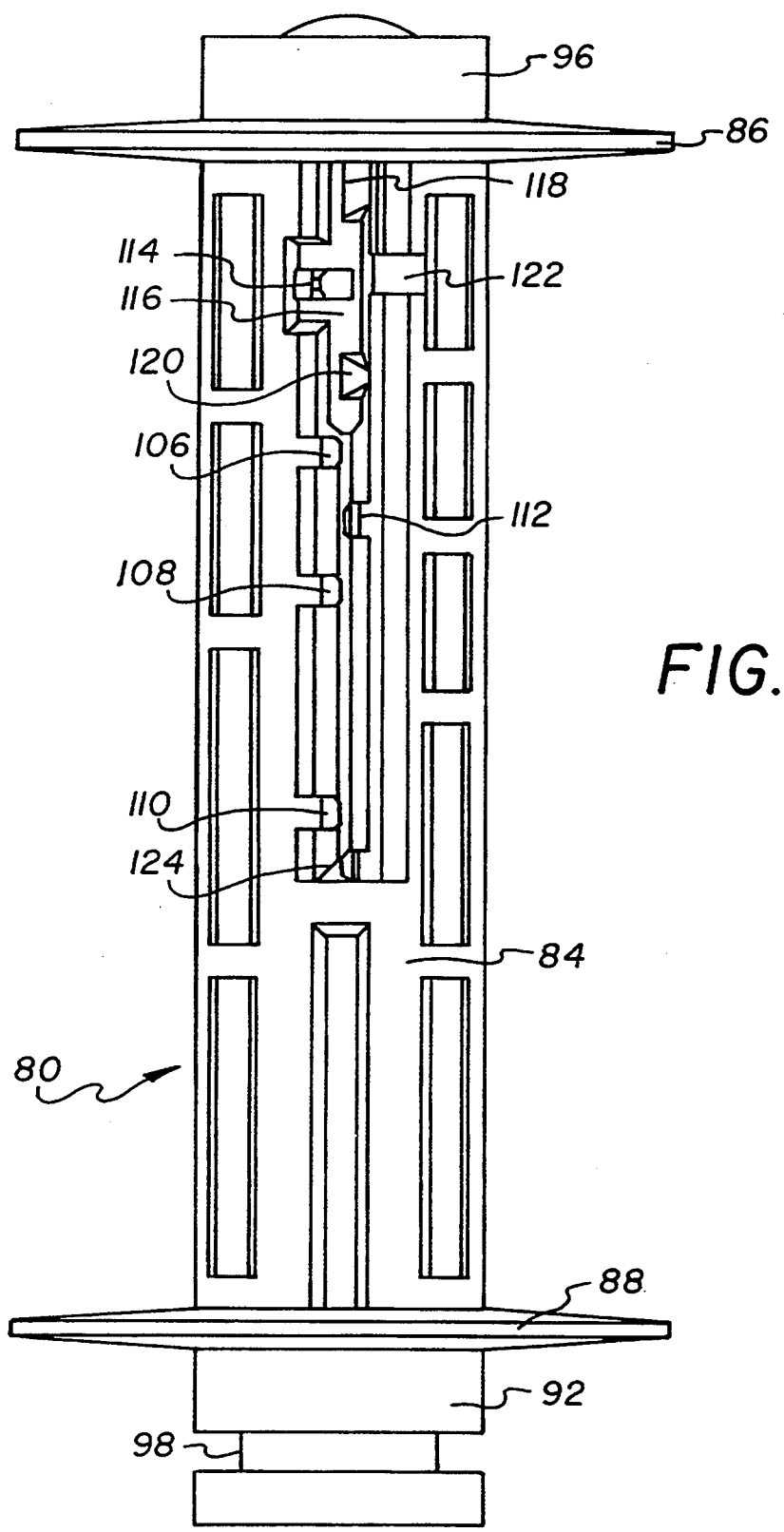
FIG. 6 is a side elevation view of the takeup spool showing other features of the filmstrip leader receiving slit.

As shown in FIGS. 5 and 6, takeup spool 80 is formed with an elongated, cylindrical, hollow shalt 84 extending between a top flange 86 and a bottom flange 88 and with a drive end 90 for receiving the driver (not shown). A short shaft portion 92 extends above top flange 86 to be fitted into an upper V-groove 94 formed in camera frame 48. A further short shaft portion 96 with a circular groove 98 and terminating at the drive end 90 extends below the bottom flange 88 and fits in the lower V-groove 100 in the camera frame 48. After the leader 54 is attached into the slit 82, the shaft portions 92 and 96 are slipped into the respective V-grooves 94 and 100 as shown in FIG. 4. When the back cover 42 is snapped in place, mating projections from the back cover 42 lock into the V-grooves 94, 100 to provide bearing surfaces for rotation of the takeup spool shaft portions 92 and 96.

As also shown in FIG. 4, the cartridge housing 53 fits in a receptacle 102 formed at the other end of the camera frame 48 with the cartridge spool 56 extending through an opening in the upper frame member 104. When positioned as shown in FIG. 4, the cartridge 50 is locked in place by snapping the rear cover 42 and the film door 46 (FIG. 3) together over the camera frame 48. Once all of the components of FIG. 3 are assembled, the filmstrip 52 may be pre-wound into a roll around the shaft 84 by retracting the anti-backup leg of metering lever 72 as described above and rotating the drive end 90, which is accessible through the bottom of the camera frame 48. The camera shutter and rewind operations are tested by making a test exposure of the first image frame, and successfully tested camera mechanisms are then packaged as described with reference to FIGS. 1 and 2. In camera mechanisms, e.g. that depicted in FIG. 3, the flash battery 60 may be replaced and the flash operation tested during the test exposure. Then, as the camera is used, the filmstrip 52 is wound back into the cartridge housing 53 an image frame at a time.

FIG. 4 depicts the leader 54 in the position either before the pre-wind operation or just before the filmstrip is fully rewound back into the cartridge housing 53. In the former case, the leader 54 has been slipped into the slit 82 such that the first perforation $59_1$ in the leader 54 has snapped over a breakaway tooth, and the engagement facilitates the pre-wind operation. In the latter case, the further advancement of the filmstrip 52 into the cartridge housing 53 causes the relatively weak breakaway tooth to fracture as it is bent by the force applied through the engaging perforation $59_1$.

Returning to FIGS. 5 and 6, the breakaway tooth 114 is depicted in relation to the slit 82. The slit 82 is only long enough to receive the narrowed leader 54 and is formed in a V-shape terminating interior of the hollow shaft 84 in a stop wall 116 on the opposite side of the hollow shaft 84. The slit 82 therefore extends from the top flange 86 to a leader guide wall 124 formed across the hollow shaft 84.

Before describing the attachment and release of the leader 54 in or from the slit 82, the function of the series of three "bump ribs" 106, 108 and 110 that extend into the slit 82 from one side wall and a fourth bump rib 112 extending from the other side wall will be explained. The bump ribs 106–112 are spaced along the length of the slit 82 away from the top flange 86, so that they narrow the slit width and contact the solid portion of the leader 54 but do not inhibit insertion or retraction of the leader 54 into or from the slit 82. Instead, the bump ribs are intended to bear against the leader 54 to form bumps in it as the film base "core sets" when rolled up after the pre-wind operation. In other words, when the leader 54 is inserted and catches on the breakaway tooth 114 as described hereafter, and the filmstrip 52 is wound in the film roll around shaft 84, the irregularly applied pressure of the bump ribs deforms the film base over time. These "bumps" formed in the leader 54 aid the photo finisher in retracting the leader 54, particularly after it has been fully drawn into the cartridge housing 53. The bumps separate or space the end of the leader from the underlying filmstrip surface, and the spaced leader may be grasped more easily by a film extractor slipped through the slot of the film cartridge housing 53 and withdrawn from the housing slit for processing.

Turning to the attachment of the leader 54 to the breakaway tooth 114, the breakaway tooth 114 extends from a recess formed in one side wall of the slit 82 laterally almost all the way across the slit 82. A pair of guiding ramps 118, 120 are formed on the opposite side wall of the slit 82 and are spaced apart on either side of the breakaway tooth 114. An edge tooth 122 extends inward between the guiding ramps 118, 120 and opposite to the breakaway tooth 114 but spaced radially therefrom. The radial spacing is related to the spacing between adjacent perforations in the filmstrip so that when the first perforation $59_1$ catches on the breakaway tooth 114 and the takeup spool is rotated, the next perforation $59_2$ catches on the edge tooth 122. The force applied during the pre-wind operation is distributed on both teeth 114 and 122. Therefore, the breakaway tooth 114 can be substantially weakened but kept sufficiently strong to operate in the pre-wind function.

Figure 7:
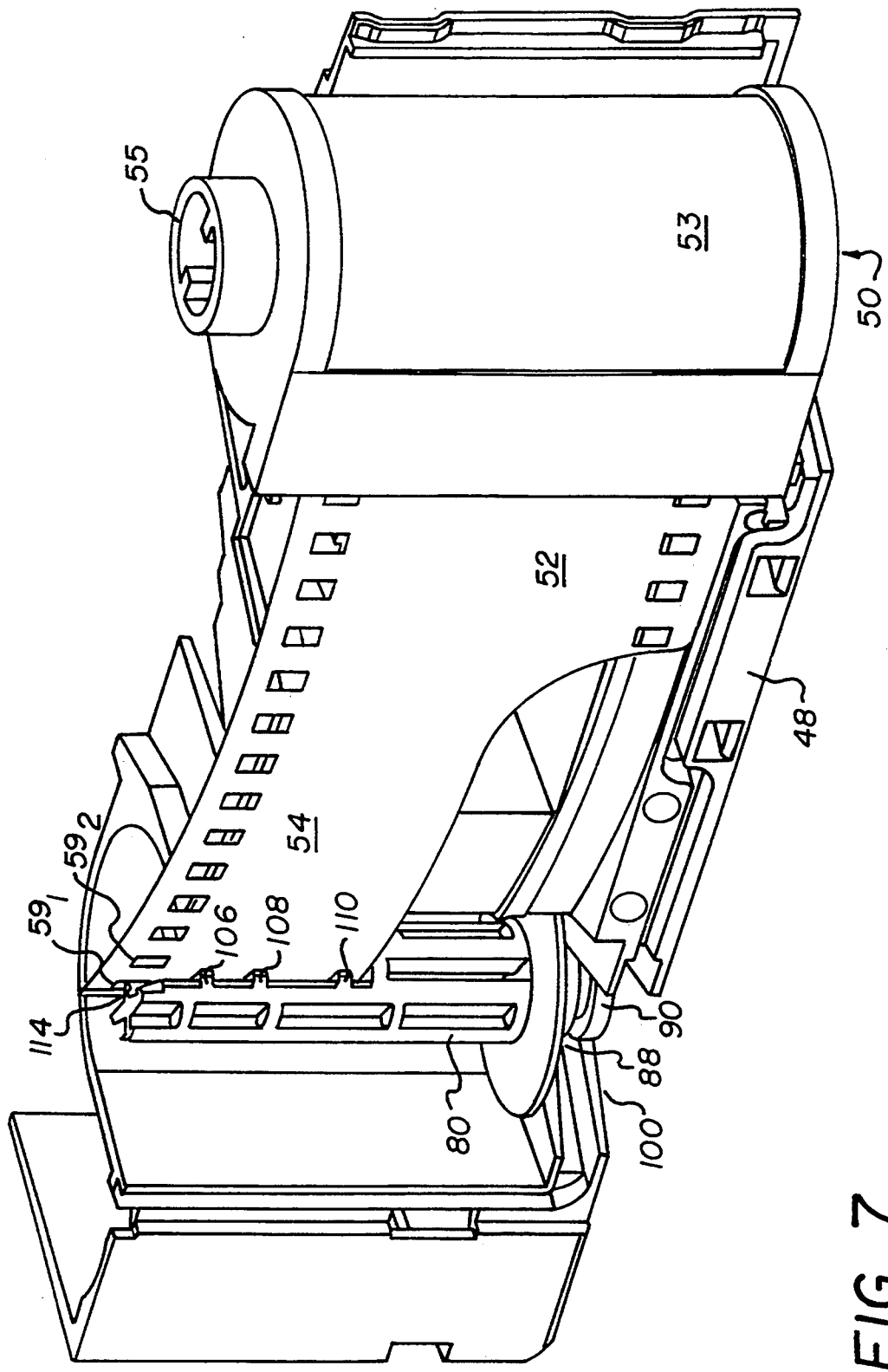
FIG. 7 is an expanded perspective view in partial section of the takeup spool and depicting the filmstrip leader in engagement in the slit of the takeup spool.
Figure 8:
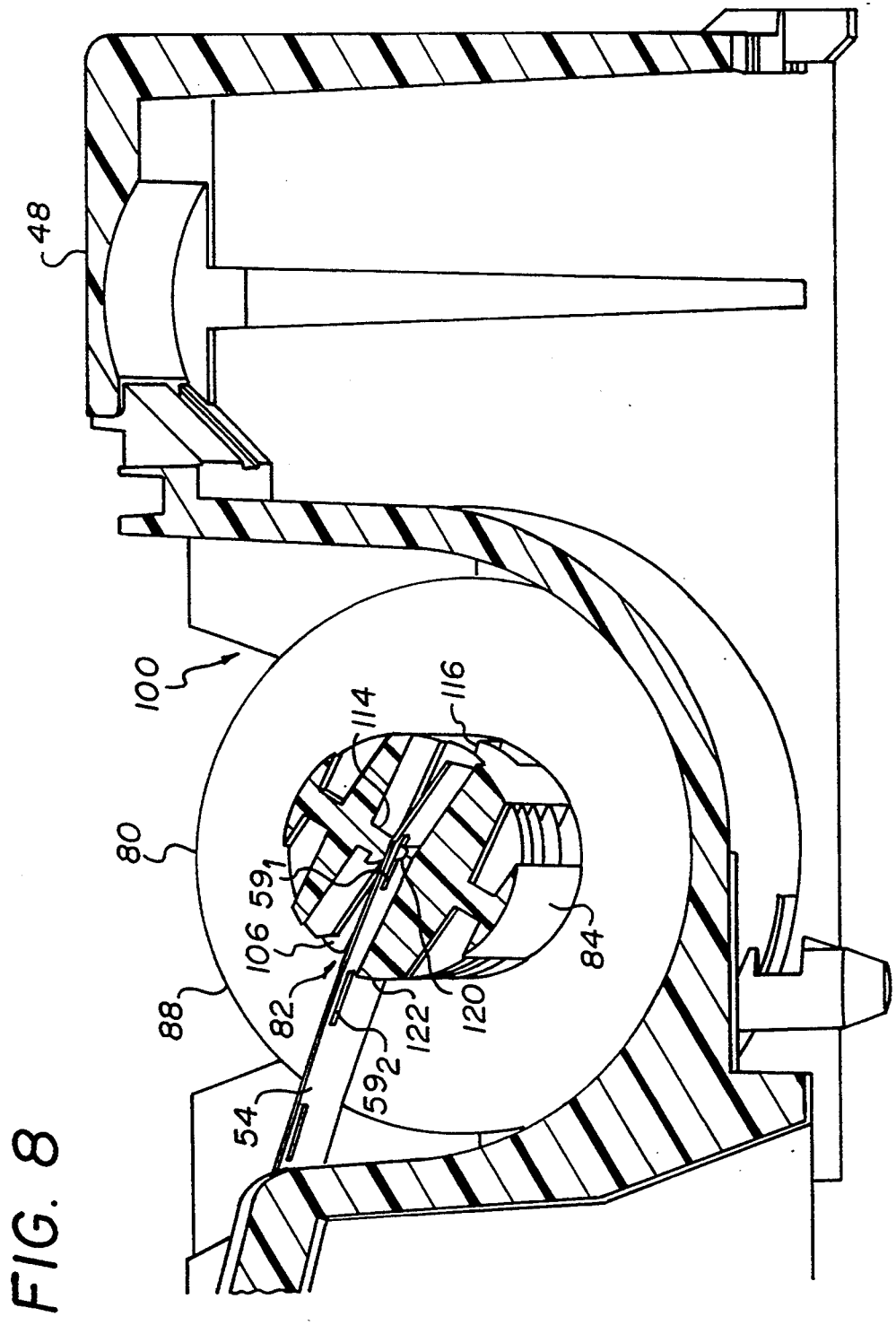
FIG. 8 is a top perspective view in partial section of the filmstrip and takeup spool showing the attachment of the filmstrip leading end to the breakaway tooth in the slit of the takeup slit.

FIGS. 7 and 8 are expanded perspective views in partial section of the takeup spool 80 and depicting the filmstrip leader 54 in engagement with the above described parts in the filmstrip receiving slit 82. The filmstrip leader 54 is shown in partial section in FIG. 8 just above the row of perforations $59_1$–$59_3$ depicted there. In FIGS. 7 and 8, the leader 54 is depicted extended fully into the slit 82 with the perforation $59_1$ caught on the breakaway tooth 114. The guiding ramp 120 is shown in FIG. 8 bearing against the surface of the filmstrip leader 54 on the lower side of the perforation $59_1$. It will be understood that the guiding ramp 118 bears against the surface of the filmstrip leader 54 on the upper side of the perforation $59_1$.

During insertion of the leader into the slit 82, the guiding ramps 118, 120 and the breakaway tooth 114 bend the filmstrip slightly until the breakaway tooth 114 slips into the perforation $59_1$. In this fashion, the filmstrip straightens in that small section, and the perforation $59_1$ catches securely on the breakaway tooth 114. Then, as the takeup spool is rotated counter-clockwise, the adjacent perforation $59_2$ slips over the edge tooth 122 to distribute the three applied during the pre-wind operation on both perforations. The fierce is distributed further onto the film roll turns as the filmstrip 52 is wound onto the takeup spool 80.

The breakaway tooth 114 is shown narrowed at its juncture with the side wall of the slit 82 that it extends inward from. The breakaway tooth 114 and the other structure of the takeup spool 80 are unitary and may be manufactured by conventional injection molding techniques to effect the narrowed and weaker juncture of attachment.

During the final, frame "zero" winding action of the filmstrip 52 into the cartridge housing 53, force is applied lengthwise along the filmstrip 52 in the direction of arrow 126 sufficiently to cause the weakened juncture of the breakaway tooth 114 to bend and fracture sufficiently to allow the release of the perforation $59_1$. The degree or bending and fracture preferably permanently deforms the tooth 114, but leaves it attached so that it is not lost in the camera frame 48 and not found during re-cycling of the camera mechanism. The degree of bending is also sufficient to prevent the secure attachment of the leader of the replacement filmstrip, so that the takeup spool 80 must be replaced in order to perform the pre-wind operation. At the least, this inhibits reloading of the camera with new film by consumers and amateur photographers and encourages the authorized recycling that maintains overall low cost and related consumer prices charged for the film package.

The above specification describes a new and improved method and apparatus for damaging a component of the camera mechanism to inhibit unauthorized reuse thereof without replacement or the damaged component. The damaged takeup spool is easily replaced when the exposed film cartridge is removed and replaced with unexposed film.

It is realized that the above description may indicate to those skilled in the an additional ways in which the principles of this invention may be used without departing from the spirit thereof. It is, therefore, intended that this invention be limited only by the scope of the appended claims.

PARTS LIST FOR FIGS. 1–8 film and camera package 10
main front cover section 12
back cover section 14
exposure or taking lens 16
viewfinder window 18
top cover section 20
shutter release button aperture 22
frame counter aperture 24
viewfinder 28
thumbwheel opening 30
thumbwheel 32
exposure counter 34
camera mechanism 36
front cover 40
back cover 42
frame wall 43
top cover 44
high energy lever legs 45, 47, 49, 51
film door 46
camera frame 48
film cartridge 50
filmstrip 52
cartridge housing 53
leader 54
cartridge spool 56
electronic flash system 58
perforations $59_1$, $59_2$, ... $59_n$
battery 60
film perforation engaging sprocket 62
metering cam 64
rear baffle 66
high energy spring 68
spring leg 69
high energy lever 70
metering lever legs 71, 73 and 75
metering lever 72
shutter blade 74
tip point 77
shutter spring 76
lens baffle 78
takeup spool 80
filmstrip receiving slit 82
hollow shaft 84
top flange 86
bottom flange 88
drive end 90
short shaft portion 92
upper V-groove 94
short shaft portion 96
circular groove 98
lower V-groove 100
receptacle 102
upper frame member 104
bump ribs 106, 108, 110, 112
breakaway tooth 114
stop wall 116
guiding ramps 118, 120
edge tooth 122
tongue guide wall 124
arrow 126

What is claimed is:

1. A recyclable, single use, photographic film package of the type having a camera mechanism fitted with a lens, a shutter release, a film advance mechanism, and containing an unexposed filmstrip attached to a film cartridge, wherein the filmstrip is pre-wound out of the film cartridge and in a roll around a takeup spool positioned on one side of an exposure gate and extends to the film cartridge disposed on the other side of the exposure gate, and wherein the film advance mechanism is operable to advance the filmstrip past the exposure gate after operation of the shutter release to make an exposure through the lens successively until all image frames of the filmstrip are exposed and advanced back into the film cartridge, wherein the improvement in said takeup spool comprises:

an attachment mechanism formed in said takeup spool for receiving a leader of said filmstrip and for attaching said filmstrip to said takeup spool to enable the winding of said filmstrip in the roll around said takeup spool in a pre-wind operation rotating said takeup spool to withdraw the filmstrip from the film cartridge, said attachment mechanism being deformable by force applied thereto upon advancement of all image frames of the photographic filmstrip back into said film cartridge sufficiently to inhibit attachment of the leader of a replacement filmstrip to said takeup spool in order to perform said prewind operation to thereby inhibit unauthorized reuse of the camera mechanism without replacement of the damaged takeup spool.

2. The photographic film package of claim 1, wherein said filmstrip is of the type having perforations formed along at least one edge thereof, and wherein the improvement in said takeup spool further comprises:

a takeup spool shaft formed with a length sufficient to receive said film roll;

an elongated film receiving slit formed in said elongated shaft having first and second sides and dimensioned for receiving an end portion of said filmstrip leader; and a breakaway tooth formed in said spool shaft extending from the first side of said slit and toward the second side thereof and positioned along the length thereof in alignment with the perforations of said filmstrip when said leader is inserted into said slit, whereby said breakaway tooth engages a perforation in said leader upon such insertion to attach said leader to said takeup sprocket and is permanently deformed by force applied thereto to release said leader upon advancement of all image frames of the photographic filmstrip back into said film cartridge to inhibit attachment of the leader of a replacement filmstrip to said breakaway tooth.

3. The photographic film package of claim 2, wherein the improvement in said takeup spool further comprises:

first and second guiding ramps formed extending inward of said slit from the second side thereof and toward said breakaway tooth, said guiding ramps spaced apart on either side of said breakaway tooth to guide said filmstrip leader around the free end of said breakaway tooth and to urge said leader toward the first side after engagement of said breakaway tooth into said perforation.

4. The photographic film package of claim 3, wherein said breakaway tooth is formed with a weakened portion at the juncture thereof with said shaft such that the fierce applied in the advancement of the filmstrip into the film cartridge is applied thereto through the filmstrip perforation engagement with said breakaway tooth.

5. The photographic film package of claim 4, wherein the improvement in said takeup spool further comprises:

a further edge tooth formed in said shaft extending from said second side toward said first side and aligned with while spaced radially from said breakaway tooth a sufficient distance to engage a second perforation in said filmstrip upon rotation of said takeup spool in said pre-wind operation to distribute the force applied by said filmstrip upon said breakaway tooth and said edge tooth during said pre-wind operation to inhibit deformation of said breakaway tooth.

6. The photographic film package of claim 5, wherein said edge tooth is dimensioned to be released from said second perforation upon full advance of said filmstrip into said film cartridge.

7. The photographic film package of claim 2, wherein the improvement in said takeup spool further comprises:

a further edge tooth formed in said shaft extending from said second side toward said first side and aligned with while spaced radially from said breakaway tooth a sufficient distance to engage a second perforation in said filmstrip upon rotation of said takeup spool in said pre-wind operation to distribute the force applied by said filmstrip upon said breakaway tooth and said edge tooth during said pre-wind operation to inhibit deformation of said breakaway tooth.

8. The photographic film package of claim 7, wherein said edge tooth is dimensioned to be released from said second perforation upon full advance of said filmstrip into said film cartridge.

9. The photographic film package of claim 7, wherein the improvement in said takeup spool further comprises:

first and second guiding ramps formed extending inward of said slit from the second side thereof and toward said breakaway tooth, said guiding ramps spaced apart on either side of said breakaway tooth to guide said filmstrip leader around the free end of said breakaway tooth and to urge said leader toward the first side after engagement of said breakaway tooth into said perforation.

10. The photographic film package of claim 7, wherein said breakaway tooth is formed with a weakened portion at the juncture thereof with said shaft such that the force applied in the advancement of the filmstrip into the film cartridge is applied thereto through the filmstrip perforation engagement with said breakaway tooth.

11. The photographic film package of claim 1, wherein said filmstrip is of the type having perforations formed along at least one edge thereof, and wherein the improvement in said takeup spool further comprises:

a takeup spool shaft formed with a length sufficient to receive said film roll;

an elongated film receiving slit formed in said elongated shaft having first and second sides and dimensioned for receiving an end portion of said filmstrip leader; and a plurality of spaced apart ribs formed in said first and second walls for deforming said end portion of said filmstrip leader upon insertion into said slit and rotation of said takeup spool in said pre-wind operation, whereby said deformations aid in retraction of said filmstrip leader from said film cartridge for photo finishing operations.

12. A lens-fitted photographic film package having an externally operable shutter member for effecting an exposure of a filmstrip image frame in an exposure gate and an externally operable film advance member for advancing to the next exposure frame after making an exposure comprising:

a light-tight camera mechanism having a shutter opening through which said exposure is made when said externally operable shutter member is operated and a camera frame defining said exposure gate;

a takeup spool having means for attaching the leader of a filmstrip thereto and disposed for rotation on a first side of said exposure gate and supported by said camera frame;

a removable, light-tight film cartridge having a cartridge spool therein supported by said camera frame and disposed on a second side of said exposure gate in said light-tight casing, said filmstrip being attached at its leader to said takeup spool and wound in a roll around said takeup spool and attached at its other end to said cartridge spool;

winding control means responsive to operation of said externally operable advance member for allowing said film winding spool to rotate so as to enable said filmstrip to be advanced by only one image frame after every exposure, said winding control means applying sufficient force through said filmstrip to said attaching means for releasing said leader and effecting permanent damage thereto to prevent the attachment to the leader of a replacement filmstrip and inhibit effective reuse of the photographic film package.

13. The photographic film package of claim 12, wherein said filmstrip is of the type having perforations formed along at least one edge thereof, and wherein said takeup spool further comprises:

a takeup spool shaft formed with a length sufficient to receive said film roll; and an elongated film receiving slit formed in said elongated shaft having first and second sides and dimensioned for receiving an end portion of said filmstrip leader; and wherein said attaching means further comprises:

a breakaway tooth formed in said spool shaft extending from the first side of said slit and toward the second side thereof and positioned along the length thereof in alignment with the perforations of said filmstrip when said leader is inserted into said slit, whereby said breakaway tooth engages a perforation in said leader upon such insertion to attach said leader to said takeup sprocket and is permanently deformed by force applied thereto to release said leader upon advancement of all image flames of the photographic filmstrip back into said film cartridge to inhibit attachment of the leader of a replacement filmstrip to said breakaway tooth.

14. The photographic film package of claim 13, wherein said takeup spool further comprises:

first and second guiding ramps formed extending inward of said slit from the second side thereof and toward said breakaway tooth, said guiding ramps spaced apart on either side of said breakaway tooth to guide said filmstrip leader around the free end of said breakaway tooth and to urge said leader toward the first side after engagement of said breakaway tooth into said perforation.

15. The photographic film package of claim 14, wherein said breakaway tooth is formed with a weakened portion at the juncture thereof with said shaft such that the force applied in the advancement of the filmstrip into the film cartridge is applied thereto through the filmstrip perforation engagement with said breakaway tooth.

16. The photographic film package of claim 15, wherein said takeup spool further comprises:

a further edge tooth formed in said shaft extending from said second side toward said first side and aligned with while spaced radially from said breakaway tooth a sufficient distance to engage a second perforation in said filmstrip upon rotation of said takeup spool in said pre-wind operation to distribute the force applied by said filmstrip upon said breakaway tooth and said edge tooth during said pre-wind operation to inhibit deformation of said breakaway tooth.

17. The photographic film package of claim 16, wherein said edge tooth is dimensioned to be released from said second perforation upon full advance of said filmstrip into said film cartridge.

18. The photographic film package of claim 13, wherein said takeup spool further comprises:

a further edge tooth formed in said shaft extending from said second side toward said first side and aligned with while spaced radially from said breakaway tooth a sufficient distance to engage a second perforation in said filmstrip upon rotation of said takeup spool in said pre-wind operation to distribute the force applied by said filmstrip upon said breakaway tooth and said edge tooth during said pre-wind operation to inhibit deformation of said breakaway tooth.

19. The photographic film package of claim 18, wherein said edge tooth is dimensioned to be released from said second perforation upon full advance of said filmstrip into said film cartridge.

20. The photographic film package of claim 18, wherein said takeup spool further comprises:

first and second guiding ramps formed extending inward of said slit from the second side thereof and toward said breakaway tooth, said guiding ramps spaced apart on either side of said breakaway tooth to guide said filmstrip leader around the free end of said breakaway tooth and to urge said leader toward the first side after engagement of said breakaway tooth into said perforation.

21. The photographic film package of claim 18, wherein said breakaway tooth is formed with a weakened portion at the juncture thereof with said shaft such that the force applied in the advancement of the filmstrip into the film cartridge is applied thereto through the filmstrip perforation engagement with said breakaway tooth.

22. The photographic film package of claim 12, wherein said filmstrip is of the type having perforations formed along at least one edge thereof, and wherein said takeup spool further comprises:

a takeup spool shaft formed with a length sufficient to receive said film roll;

an elongated film receiving slit formed in said elongated shaft having first and second sides and dimensioned for receiving an end portion of said filmstrip leader; and a plurality of spaced apart ribs formed in said first and second walls for deforming said end portion of said filmstrip leader upon insertion into said slit and rotation of said takeup spool in said pre-wind operation, whereby said deformations aid in retraction of said filmstrip leader from said film cartridge for photo finishing operations.

* * * * *

UNITED STATES PATENT AND TRADEMARK OFFICE
CERTIFICATE OF CORRECTION

PATENT NO. : 5,452,033
DATED : Sep. 19, 1995
INVENTOR(S) : Edward N. Balling, et al It is certified that error appears in the above-indentified patent and that said Letters Patent is hereby corrected as shown below:

Col. 11, line 55 "fierce" should read --force--.

Col. 13, line 43 "flames" should read --frames--.

Signed and Sealed this

Fifth Day of December, 1995

Attest:

BRUCE LEHMAN

Attesting Officer

Commissioner of Patents and Trademarks